Oct. 6, 1959 E. DAVIES ET AL 2,907,822

INTERFERENCE REDUCTION IN TELEVISION AND OTHER COMMUNICATION SYSTEMS

Filed March 2, 1953 2 Sheets-Sheet 1

Inventors:
Eric Davies and
Henryk Mirzwinski;
By their attorneys,
Baldwin & Wight Inventors.
Eric Davies and
Henryk Mirzwinski;
By Baldwin & Wight
Attys.

United States Patent Office 2,907,822
Patented Oct. 6, 1959

2,907,822

INTERFERENCE REDUCTION IN TELEVISION AND OTHER COMMUNICATION SYSTEMS

Eric Davies, Burnham-on-Crouch, and Henryk Mirzwinski, Chelmsford, England, assignors to Marconi's Wireless Telegraph Company Limited, London, England, a British company Application March 2, 1953, Serial No. 339,736

Claims priority, application Great Britain April 17, 1952

4 Claims. (Cl. 178—7.3)

Figure 1:
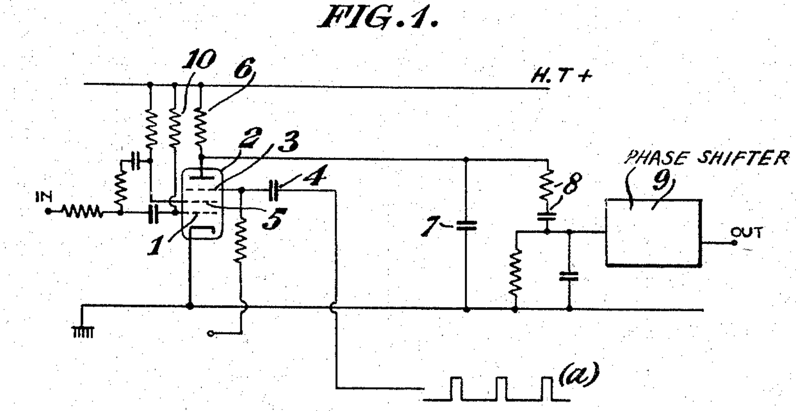

This invention relates to interference reduction in television and other communication systems in which the intelligence conveying signals are periodically interrupted or brought to a fixed level. The invention has for its object to provide improved and simple means whereby elimination or a high degree of reduction of hum and other low frequency interference may be obtained in such systems.

A difficulty commonly encountered in television systems is the addition of hum, usually mains hum, to the television signals. A common source of such hum interference injection is mains frequency voltages flowing in the outer screens of coaxial cables used for transmitting the television signals. The impedance of a coaxial screen is in practice often sufficiently high to cause an interference hum voltage which may amount to several times the television peak-to-peak amplitude. The present invention may be used to eliminate or substantially reduce hum interference introduced in this or in some similar way, i.e. interference which is additional to the television signals as distinct from hum interference which may be present in the modulated wave envelope of the signals. As will be obvious later, the present invention will not eliminate hum interference actually present in the modulated envelope but only additional or injected hum interference. It is, however, such additional or injected hum interference which is in usual practice, the main cause of trouble.

In practice the level of an injected asynchronous means frequency interference signal which can be tolerated when added to a video signal, is approximately —55 db and if one assumes the peak-to-peak hum amplitude to be approximately twice the amplitude of the video signal, a reduction of at least 60 db is called for. The usual technique for reducing such added or injected hum is to provide a so-called clamping circuit comprising an electronic switch keyed at line frequency and which is arranged to cause the grid of a television signal amplifier in the system to be fixed at a predetermined potential once per line during the blanking period. The duration of time of such clamping is a matter of convenience but it always takes place during the blanking period and only during that period. If one assumes the clamping for such a system to cover 10% of a line the reduction in hum amplitude is only approximately 30 db for the case of a television system using a 405 line interlaced picture at 50 fields per second. This leaves a very substantial residue of hum in the form of an incremental hum signal during each line and which is of amplitude given by the instantaneous amplitude of the hum wave—normally a virtually sinusoidal wave. This residual signal cannot be removed by any clamping circuit since it occurs during the periods of picture information. Since, in the case assumed, it has a maximum peak-to-peak value of —30 db with respect to the peak-to-peak value of the television signals, the known clamping arrangement above described leaves a residuum of at least 30 db to be removed prior to clamping. The present invention seeks to effect such removal and eliminate hum interference occurring during picture information periods.

According to this invention a circuit arrangement for reducing or eliminating hum in a television signal circuit comprises means for sampling the television signals at recurrent periods when picture information signals do not occur, means for integrating the sampled signals to provide an integrated hum correcting signal and means for utilizing said integrated hum correcting signal for opposing the hum interference in said circuit.

Preferably the sampling is effected by means of a gate circuit to which television signals are applied and which is gated to the open condition by applying thereto gate opening signals occurring between television lines. By sampling the signal between television lines the sampled signals obtained are caused to be of amplitudes which are independent of picture information since there are no such signals at these times. The amplitudes of the samples will, however, be proportional to the hum amplitudes at these times since the effect of injected or additional hum is to add to the ordinate values of the television signals the simultaneously occurring ordinate values of the hum interference. In some cases and depending on the circuits employed, a constant may be added to the amplitudes of the samples but in such cases the constant is rejected by filtering means to be described later.

The invention is applicable alike to those television systems in which there is a composite signal consisting of picture information signals and synchronizing signals and to those systems in which the television signal is "blanked."

The signal is D.C. restored in such a way as to permit the amplitude of the sampled signal with the interference signal added as measured from a fixed level of the television wave form to be related to the tips of the hum waveform without being dependent on the picture content. The said fixed level may be the level of the bottom of the synchronizing pulses or it may be the "black" level.

Figure 2:
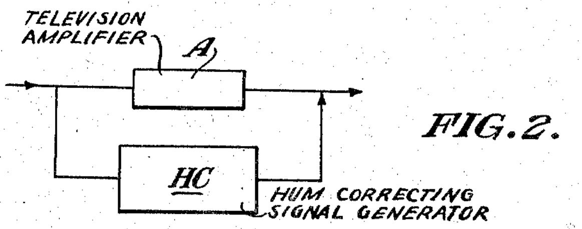
Figure 3:
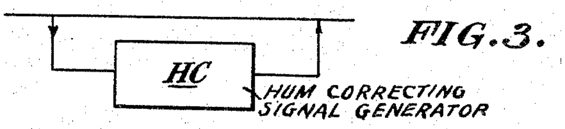
Figure 4:
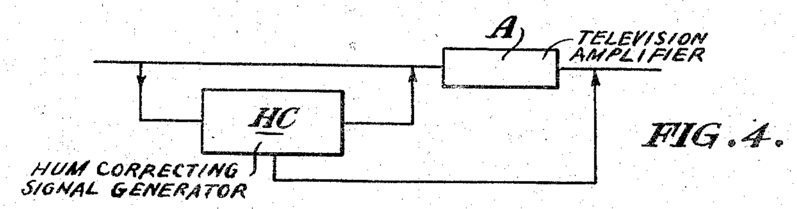
Figure 5:
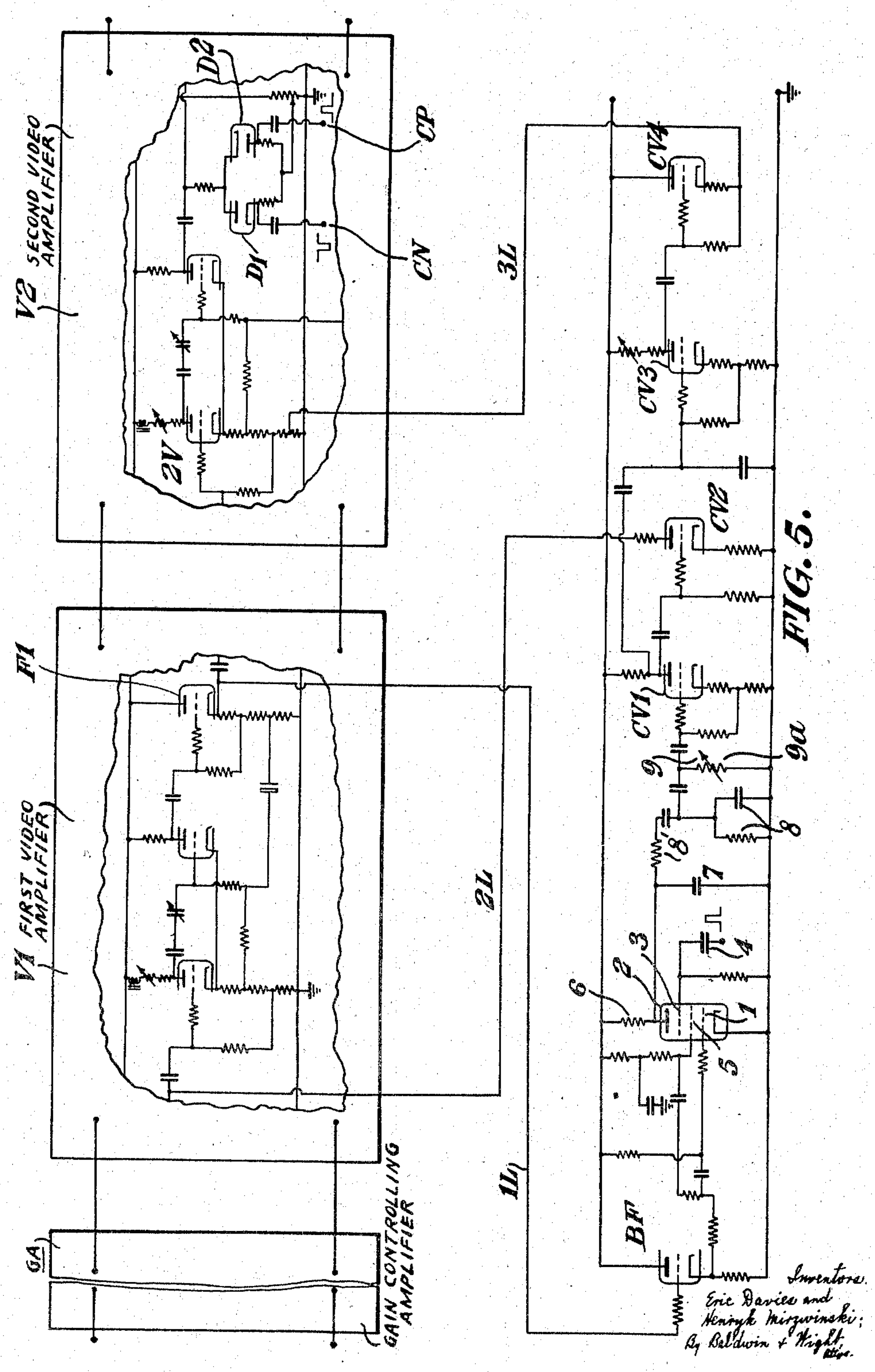

The invention is illustrated in the accompanying drawings in which Fig. 1 shows in simplified diagrammatic manner a circuit for producing hum reducing or eliminating correction signals, Figs. 2, 3 and 4 are block diagrams showing different ways of applying the hum correcting signals obtained and Fig. 5 is a diagram of a system shown partly in block diagram form and partly in circuit diagram form.

Referring to Fig. 1 signals which are assumed to be composite signals consisting of picture information, synchronizing signals and superimposed added hum interference are applied at In to the control grid 1 of a gated valve 2 which is gated by means of positive pulses as indicated conventionally at (*a*) and which are applied to the suppressor grid 3 through a condenser 4. In the absence of positive gating pulses the valve 2 is cut off by negative bias applied to its suppressor grid. Negative feedback is employed as shown between the screen grid 5 and the control grid 1 to ensure a linear relationship, between the contour of the anode current pulses which occur when the valve 2 is opened, and the input signals at the control grid. Anode current pulses are developed across an anode load 6 and are integrated by a condenser 7 which substantially removes the gating frequency and any constant which may have been added to the amplitudes of the sample due to the switching process employed. This gating frequency is the scanning line frequency and the gating pulses are arranged to occur between lines i.e. during line "blanking" periods. Their timing can be so arranged that gating occurs either during the "front porch" or the "back porch" or during line synchronizing periods as may be desired. Further filtering is provided in the arrangement of Fig. 1 by a so-called Wien bridge incorporating the elements marked 8 and as known per se. The output from this bridge is fed through a phase shifter 9 so that the output at the terminal Out will be at 180° to the interference hum component present in the input at In. Any other suitable known filtering arrangement can be used. D.C. restoration on the tips of the combined video and unwanted signal is achieved by a resistance-capacity network including the grid leak 10 which is returned to HT+. This method of D.C. restoration is suitable for the case assumed in Fig. 1 where the signal applied at In is a composite signal of negative polarity with the synchronizing signals in the positive direction so that restoration is effected on the synchronizing signal tips. Resulting from the gating by the line frequency blanking pulses which are applied to the suppressor grid 3 of the valve 2, a series of pulses are developed across the load resistance 6 of that valve. These pulses, however, are integrated in the pulse integrator condenser indicated at 7, and are further filtered in the Wien bridge which follows. Consequently, there will be developed at the output terminals of the network a wave form which is dependent upon the discreet amplitudes of the pulses provided in the output of the valve 2, and this wave form is precisely that due to the network hum voltage which is desired to cancel out. The pulses are integrated into the original wave form producing them, these pulses occurring during, say, the "back porch" period of the television wave form. Other methods of D.C. restoration as known per se may be used in other cases. The output signals at Out are used as will be described later as hum correcting signals to counterbalance the original hum.

Figs. 2, 3 and 4 show in block diagram form three ways in which the hum correcting signal may be applied to counterbalance hum. In Fig. 2, A is a television amplifier inserted in a line in which the signals flow as indicated by the arrows and HC represents a hum correcting signal generator in accordance with this invention and as typified by Fig. 1. As will be seen in Fig. 2 the unit HC is so connected that direct cancellation of the unwanted hum is obtained by mixing the anti-phase output component from the said unit HC with the video signal and added hum fed out of the amplifier A, the unit HC thus bridging the amplifier from input to output. This type of arrangement is very simple and inherently stable and by it hum cancellation of the order of 20 to 1 is easily obtained. It has the disadvantage that the hum correcting signal has to be exactly equal in amplitude and of exactly opposite phase to the hum present in the output from the amplifier A while furthermore good linearity and high stability of gain and phase in both the units A and HC are necessary.

In the modified arrangement of Fig. 3 cancellation of the unwanted hum signal is obtained by feeding back the output of the unit HC to its input in reversed phase. The method used here is analogous to that used in the well known circuits for stabilizing power supplies and reducing unwanted signals appearing in an output due to lack of smoothing or due to varying load. In practice, cancellation of the order of between 5 and 10 to 1 is easily obtained with an arrangement of the nature of Fig. 3.

The advantages of an arrangement as in Fig. 3 are that the unwanted hum component is reduced at relatively low level thus avoiding the need for amplifiers capable of accepting the peak-to-peak value of television signal plus hum, while exactness of phase opposition is not so necessary in this case as in the case of Fig. 2 since in Fig. 3 there is the aiding effect of negative feed back. Furthermore the reduction of the unwanted hum signal is no longer dependent on the amplitude of the cancelling signal but is at a maximum for any given value of gain through the unit HC, the higher the gain of this unit the greater being the reduction of the unwanted signal. Its principal disadvantage is that, owing to gain and phase shifts at frequencies other than the frequency at which hum cancellation takes place, great care has to be taken to ensure that self-oscillation shall not occur and this applies an upper limit to the gain which can be safely used for the unit HC for a given frequency-phase characteristic.

Fig. 4 shows a further arrangement which is in effect a combination of the arrangements of Figs. 2 and 3 the unit HC having two outputs both at 180° to its own input, one output being applied as in Fig. 2 and the other being applied as in Fig. 3. With an arrangement as in Fig. 4 reductions of hum of between 50 to 1 and 100 to 1 are readily obtainable and, in conjunction with a clamped amplifier as known per se, an arrangement of the type of Fig. 4 will reduce an unwanted hum signal by −60 db with ease.

Fig. 5 shows a complete installation in accordance with the invention. In Fig. 5 the block GA represents a gain controlling amplifier, the block V1 a first video amplifier and the block V2 a second video amplifier. It will be observed that the block V2 incorporates a clamping arrangement as known per se and including the diodes D1 and D2, positive going clamp pulses being applied at CP and negative going clamp pulses being applied at CN. As this clamping arrangement is not per se part of this invention and is, as stated, already known, it requires no further description here.

Output from the cathode of the final valve F1 of the first video amplifier is taken over lead 1L through a buffer amplifier including a valve BF to a gated valve 2 connected generally as in Fig. 1 and feeding through a Wien bridge (also as in Fig. 1) to a phase shifting network generally indicated at 9 and incorporating a variable resistance 9*a* for hum phase adjustment. After amplification in valves CV1 and CV2 the integrated correcting signal is applied over lead 2L to a suitable point in the amplifier V1 earlier than the valve F1. Also, after amplification in the valves CV3 and CV4 the hum correcting signal is applied over the lead 3L to the cathode circuit of a valve 2V in the second amplifier V2. The arrangement of Fig. 5 is thus of the nature of that of Fig. 4. In Fig. 5 the gated valve 2 is fed via a buffer valve in order to bring the signal at the control grid of said gated valve to a level suitable for D.C. restoration and to take full advantage of the gain of the apparatus in block V1 which enables the gain of the hum cancelling system to be reduced for a given degree of hum cancellation. The phase and frequency requirements of the hum cancelling system are also eased as a result of the negative feedback provided in the apparatus in block V1 thus permitting the cancelling signal to be fed to the input of said apparatus.

We claim:

1. A circuit arrangement for reducing or eliminating interference having a frequency much lower than the line frequency in a television signal circuit comprising gated means consisting of a gating valve having at least two input grid electrodes, means for biasing said gating valve whereby said gating valve is rendered non-conductive, means for applying television signals to one input electrode of the gating valve, means for applying a pulse of appropriate amplitude and polarity to the other input electrode of the gating valve conductive at recurrent periods when picture information signals do not occur for sampling the television signals during said periods, means for integrating the sampled signals to provide an integrated interference correcting signal, means for injecting said integrated interference correcting signal into the television signal circuit in anti-phase to the interference therein for opposing the interference in said circuit, and D.C. restoring means adapted to bring the wave form of the television signal and interference to a fixed level prior to said sampling.

2. A circuit arrangement for reducing or eliminating interference having a frequency much lower than the line frequency in a television signal circuit as set forth in claim 1 wherein said gated means is actuated to an open condition by applying thereto gate opening signals occurring between television signals.

3. A circuit arrangement for reducing or eliminating interference having a frequency much lower than the line frequency in a television signal circuit as set forth in claim 1 in which said D.C. restoring means relates the amplitude of the sampled signal with the interference signal added as measured from a fixed level of the television signal wave form to the tips of the interference wave form without being dependent on the picture content.

4. A circuit arrangement for reducing or eliminating interference having a frequency much lower than the line frequency in a television signal circuit as set forth in claim 1 which includes a filter means including a condenser for eliminating the gating frequency due to the pulses applied to said valve and a phase shifter fed from said condenser through said filter means and dimensioned to produce a phase relation of substantially 180° between input interference component present at said one electrode and the signals at the output of said phase shifter.

References Cited in the file of this patent

UNITED STATES PATENTS

| | | |
|---|---|---|
| 2,284,085 | Collard | May 26, 1942 |
| 2,302,520 | Bingley | Nov. 17, 1942 |
| 2,585,883 | Wendt | Feb. 12, 1953 |
| 2,637,773 | Bedford | May 5, 1953 |
| 2,675,424 | Germany | Apr. 13, 1954 |
| 2,681,948 | Avins | June 22, 1954 |